3,531,549
CATECHOL HALF ESTERS OF BETA-
HALOETHYLPHOSPHONIC ACID
David I. Randall, Easton, Pa., assignor to GAF Corporation, New York, N.Y., a corporation of Delaware
No Drawing. Filed Feb. 23, 1967, Ser. No. 617,820
Int. Cl. A01n 9/36; C07f 9/12
U.S. Cl. 260—953          11 Claims

ABSTRACT OF THE DISCLOSURE

The compounds are catechol or substituted catechol half esters of beta-haloethylphosphonic acid, e.g., the catechol half ester of beta-chloroethylphosphonic acid. The compounds possess plant growth regulating properties, e.g., control of apical dominance, and are prepared by the hydrolysis of the catechol and substituted catechol cyclic esters of beta-haloethylphosphonic acid.

---

This invention relates to novel phosphorous compounds and more particularly to novel phosphonic acid half esters, compositions thereof and a method for their production.

A wide variety of esters of phosphonic acid are known in the art and many of these have agricultural applications. In general, such esters have herbicidal activity but surprisingly, the phosphonic acid half esters of the invention possess plant growth regulating properties and do not demonstrate any essential phytotoxic behavior.

An object of this invention is to provide novel phosphonic acid half esters.

Another object of this invention is to provide a process for producing such phosphonic acid half esters.

A further object of this invention is to provide phosphonic acid half esters that possess plant growth regulating properties.

Still another object of this invention is to provide novel compositions of such phosphonic acid half esters.

These and other objects of this invention should be readily apparent from reading the following detailed description thereof.

The objects of this invention are broadly accomplished by producing catechol or substituted catechol half esters of beta-haloethylphosphonic acid wherein the substituent group of the catechol, if any, is not strongly negative. The phosphonic acid half esters of the invention are represented by the following structural formula:

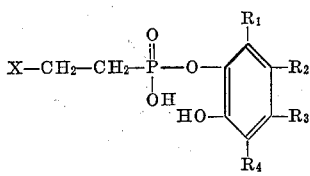

wherein X is a halo group such as fluoro, bromo, iodo, or chloro, preferably chloro or bromo, and $R_1$, $R_2$, $R_3$ and $R_4$ are substituent groups which are not strongly negative, such as halo, preferably bromo or chloro, hydrogen, alkyl, alkoxy, preferably lower alkyl and lower alkoxy, and may be the same or different groups and two of the substituent groups may form a condensed ring, either a hydrogenated or a non-hydrogenated condensed ring.

The phosphonic acid half esters of the invention are produced by hydrolyzing catechol cyclic esters represented by the following structural formula:

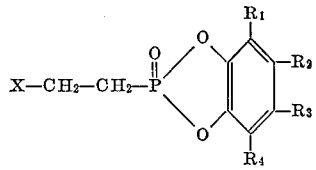

wherein X, $R_1$, $R_2$, $R_3$ and $R_4$ are as defined above. The hydrolysis of the cyclic ester, unlike hydrolysis of other phosphonate esters, proceeds rapidly at about room temperature with evolution of heat and consequently, there is no need to employ elevated temperatures, although temperatures up to about 60° C. may be employed. Temperatures higher than about 60° C. should be avoided since the phosphonic acid half esters of the invention hydrolyze at such temperatures.

The catechol cyclic esters employed as a starting material for producing the compounds of the invention may be prepared in accordance with the process disclosed by Kabachnik et al., Izvest. Akak Nauk SSSP, o.k.h.n. 1947, 97 (Chem. Abstracts 42, 4132e) both hereby incorporated by reference. Thus, as disclosed by Kabachnik et al., the starting materials for producing the compounds of the invention are produced by reacting a beta-haloethylphosphonyl chloride with catechol or a substituted catechol, e.g., beta-choroethylphosphonyl chloride is heated with catechol at 150–160° C. to produce the catechol cyclic ester of beta-chloroethylphosphonic acid. Similarly, a substituted catechol, for example, a halo catechol, produced by adding chlorine or bromine to an acetic acid solution of catechol, may be reacted with beta-chloroethylphosphonyl chloride to produce the corresponding cyclic ester. As a further alternative, the catechol cyclic ester of beta-chloroethyphosphonic acid may be treated to effect substitution thereof. Thus, for example, an O-dichlorobenzene solution of the catechol cyclic ester of beta-chloroethylphosphonic acid may be warmed with an excess of sulfonyl chloride to produce a tetrachloro substituted catechol cyclic ester of beta-chloroethylphosphonic acid.

The following examples are illustrative of the invention but the scope of the invention is not to be limited thereby.

EXAMPLE I 4.4 parts of the cyclic catechol ester of chloroethylphosphonic acid were added to 44 parts of water, with stirring at 27° C. An exothermic heat of hydrolysis was noted in a 3° temperature rise to 30° C. The slightly milky solution was heated briefly to 50° C. and water removed at this temperature in a flash evaporator at a vacuum of about 30 mm. 4.8 parts of the catechol half ester of beta-chloroethylphosphonic acid was recovered as a colorless liquid. The phosphonic acid half ester was soluble in water, had a titration curve typical of a strong monobasic acid and showed no tendency to hydrolyze in aqueous solutions at room temperature, even after standing for three weeks. The phosphonic acid half ester hydrolyzes rapidly in boiling water.

EXAMPLE II 3.4 parts of the cyclic catechol ester of chloroethylphosphonic acid were added to 0.28 part of water (the stoichiometric amount of water required for hydrolysis) at 30° C. and there was a temperature rise to 80° C. The mixture was cooled and 3.6 parts of the catechol half ester of beta-chloroethylphosphonic acid was recovered as a viscous liquid.

The above procedure is also employed to produce the catechol half ester of beta-bromoethylphosphonic acid.

EXAMPLE III

A variety of other phosphonic acid half esters are produced in a manner similar to the procedure described in Examples I and II, as illustrated in the following table:

TABLE

| | Starting material | Product |
|---|---|---|
| 1 | Cl-substituted catechol cyclic ester of $P(=O)-CH_2-CH_2Cl$ | Cl-substituted phenyl $-O-P(=O)(OH)-CH_2-CH_2Cl$ and Cl-substituted phenyl $-OH$, $-O-P(=O)(OH)-CH_2-CH_2Cl$ |
| 2 | Tetrachlorocatechol cyclic ester of $P(=O)-CH_2-CH_2Cl$ | Trichloro phenyl $-O-P(=O)(OH)-CH_2-CH_2Cl$, $-OH$ |
| 3 | Methyl-substituted catechol cyclic ester of $P(=O)-CH_2-CH_2Cl$ | $H_3C$-substituted phenyl $-O-P(=O)(OH)-CH_2-CH_2Cl$, $-OH$ and $H_3C$-substituted phenyl $-OH$, $-O-P(=O)(OH)-CH_2-CH_2Cl$ |
| 4 | Cl, $H_3C$-substituted catechol cyclic ester of $P(=O)-CH_2-CH_2Cl$ | Cl, $H_3C$-substituted phenyl $-O-P(=O)(OH)-CH_2-CH_2Cl$, $-OH$ and Cl, $H_3C$-substituted phenyl $-OH$, $-O-P(=O)(OH)-CH_2-CH_2Cl$ |
| 5 | Naphthalene-diol cyclic ester of $P(=O)-CH_2-CH_2Cl$ | Naphthyl $-O-P(=O)(OH)-CH_2-CH_2Cl$, $-OH$ |
| 6 | Dibromo catechol cyclic ester of $P(=O)-CH_2-CH_2Cl$ | Br-substituted phenyl $-O-P(=O)(OH)-CH_2-CH_2Cl$, $-OH$ and Br-substituted phenyl $-OH$, $-O-P(=O)(OH)-CH_2-CH_2Cl$ |

The above half esters of beta-bromoethylphosphonic acid are also prepared by the procedure of Examples I and II.

The half esters of the invention are generally soluble in water and aqueous solutions thereof may be applied to growing plants. The compounds have valuable plant growth regulating properties, including the ability to control apical dominance, i.e., the lead bud which ordinarily dominates the plant and produces one stalk is stunted and the side buds are stimulated to produce more side shoot growth. The half esters of the invention are generally sprayed onto the plants as aqueous solutions in amounts to provide between about 0.1 lb. and about 16 lbs. or higher, e.g., up to 25 or 30 lbs. of the compound per acre of plants. The plants which may be treated with the half esters of the invention include small grains, such as oats (*Avena sativa*), wheat (*Triticum aestivum*) and barley (Hordeum spp.); cotton (*Gossypium hirsutum*); privet (*Ligustrum ovalifolium*); soybeans (*Glycine max.*); snapbeans (*Phaseolus vulgaris*); tomatoes (*Lycopersion esculentum*); kidney beans (*Phaseolus vulgaris*); and the like. The above plants are merely illustrative and do not limit the invention in any manner.

Plants treated with the half ester of the invention have greater flower or fruit production, as illustrated by the following example:

EXAMPLE IV

An aqueous solution of the catechol half ester of beta-chloroethylphosphonic acid was sprayed onto seedling snapbean plants (*Phaseolus vulgaris*) at the first trifoliate stage at a rate sufficient to apply an equivalent of 1 lb. of the compound per acre of soil surface. Inspection of the treated plants sixty days following spray application revealed increased fruiting, as determined by bean pod counts as compared with untreated plants, and also revealed as an increase in total plant weight as compared with untreated plants.

OBSERVATIONS 60 DAYS AFTER TREATMENT

| Treatment: | No. bean pods/ plant | Plant weight, grams |
|---|---|---|
| Control | 6 | 29 |
| Phosphonate compound | 15 | 70 |

Visual comparison of the check and treated plants showed the latter were shorter in height with heavier stems and appreciably more lateral shoots.

The half esters of the invention also show antioxidant activity in organic compositions and aqueous solutions thereof may be applied to iron, e.g., iron pipes, to inhibit the formation of ferric hydroxide. In addition, organic solutions of the half esters of the invention, e.g., dissolved in hot oils, may be used as anti-wear additives, antistatic agents, and dye receptors, e.g., by application to or incorporation in plastic foils or fibers.

Many modifications and variations of the present invention are possible in light of the above teachings. It is therefore to be understood that within the scope of the appended claims the invention may be practiced otherwise than as specifically described.

What is claimed is:

1. A compound having the following formula:

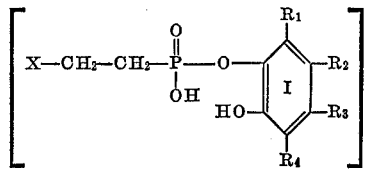

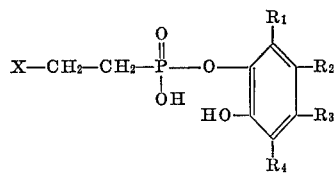

2. The compound as claimed in claim 1 wherein X is selected from the group consisting of chloro and bromo.

3. The compound as claimed in claim 2 wherein one of the $R_1$, $R_2$, $R_3$ and $R_4$ groups is halo and the remaining groups are hydrogen.

4. The compound as claimed in claim 2 wherein one of the $R_1$, $R_2$, $R_3$ and $R_4$ groups lower is alkyl and the remaining groups are hydrogen.

5. The compound as claimed in claim 2 wherein $R_2$ and $R_3$ taken together and with the ring to which they are attached form a naphthalene nucleus and the remaining groups are hydrogen.

6. The compound as claimed in claim 2 wherein at least two of the groups $R_1$, $R_2$, $R_3$ and $R_4$ are halo and the groups that are not halo are hydrogen.

7. The compound as claimed in claim 2 wherein one of the groups $R_1$, $R_2$, $R_3$ and $R_4$ is halo, one of the groups is lower alkyl, and the remaining are hydrogen.

8. The compound as claimed in claim 1 wherein the compound is:

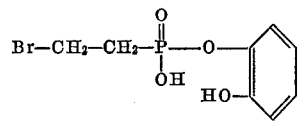

9. The compound as claimed in claim 1 wherein the compound is:

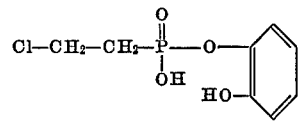

10. The compound as claimed in claim 1 wherein the compound is:

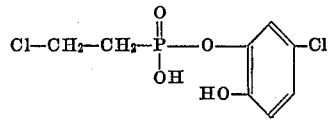

11. The compound as claimed in claim 1 wherein the compound is:

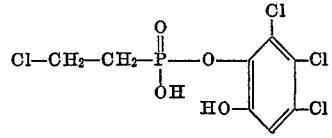

References Cited

UNITED STATES PATENTS 3,118,876   1/1964   Ukita et al. _____ 260—953 XR

CHARLES B. PARKER, Primary Examiner

A. H. SUTTO, Assistant Examiner

U.S. Cl. X.R.

71—86; 260—936, 937, 983

PO-1050
(5/69)

UNITED STATES PATENT OFFICE
CERTIFICATE OF CORRECTION

Patent No. 3,531,549        Dated  September 29, 1970

Inventor(s)  DAVID I. RANDALL

It is certified that error appears in the above-identified patent and that said Letters Patent are hereby corrected as shown below:

Column 2, line 41, "chloroethyphosphonic" should read -- chloroethylphosphonic --. Column 5, lines 65-70, the entire structural formula and the enclosing brackets should be deleted. Column 6, line 7, insert below the structural formula -- wherein X is a halo group and $R_1$, $R_2$, $R_3$ and $R_4$ are selected from the group consisting of hydrogen, lower alkyl, halo and wherein $R_2$ and $R_3$ taken together and with the ring to which they are attached form a naphthalene nucleus. --; line 14, "lower is alkyl" should read -- is lower alkyl --; lines 55-60, the right-hand benzene ring radical should read

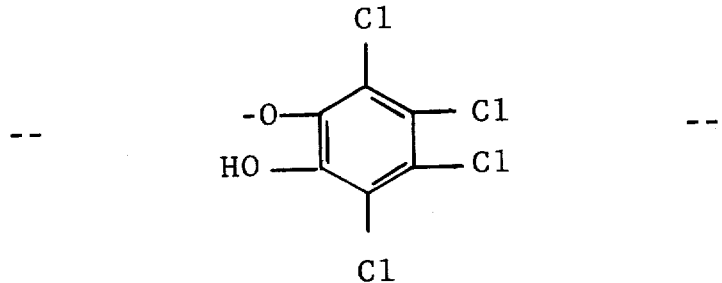

Signed and sealed this 4th day of July 1972.

(SEAL)
Attest:

EDWARD M. FLETCHER, JR.
Attesting Officer

ROBERT GOTTSCHALK
Commissioner of Patents